US009813121B1

(12) United States Patent
Liang

(10) Patent No.: US 9,813,121 B1
(45) Date of Patent: *Nov. 7, 2017

(54) MASSIVE MIMO MULTI-USER BEAMFORMING AND SINGLE CHANNEL FULL DUPLEX FOR WIRELESS NETWORKS

(71) Applicant: Ping Liang, Newport Coast, CA (US)

(72) Inventor: Ping Liang, Newport Coast, CA (US)

(73) Assignee: RF DSP Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/494,496

(22) Filed: Apr. 22, 2017

Related U.S. Application Data

(62) Division of application No. 15/036,436, filed as application No. PCT/US2014/065853 on Nov. 16, 2014.

(60) Provisional application No. 61/905,260, filed on Nov. 17, 2013.

(51) Int. Cl.
| | |
|---|---|
| *H04B 7/022* | (2017.01) |
| *H04W 16/32* | (2009.01) |
| *H04B 7/06* | (2006.01) |
| *H04L 5/14* | (2006.01) |
| *H04B 1/10* | (2006.01) |
| *H04W 72/04* | (2009.01) |
| *H04B 7/0456* | (2017.01) |
| *H04W 88/08* | (2009.01) |

(52) U.S. Cl.
CPC ........... *H04B 7/022* (2013.01); *H04B 1/1018* (2013.01); *H04B 7/0456* (2013.01); *H04B 7/0617* (2013.01); *H04L 5/14* (2013.01); *H04W 16/32* (2013.01); *H04W 72/042* (2013.01); *H04W 72/0413* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2014/0307702 | A1* | 10/2014 | Mese | ............... H04B 7/0456 370/330 |
| 2015/0326269 | A1* | 11/2015 | Ko | .................... H04B 1/525 375/219 |

\* cited by examiner

*Primary Examiner* — Sulaiman Nooristany
(74) *Attorney, Agent, or Firm* — Guosheng Wang; United States Research and Patent Firm

(57) ABSTRACT

This invention presents a method and apparatuses for wireless networking comprising one or more BS with $N_{bs}$ antennas; two or more SCs in the range of a BS where a SC has $N_{sc}$ antennas, uses $N_{sc1} \leq N_{sc}$ antennas for communication with a BS and uses $N_{sc2} \leq N_{sc}$ antennas for communication with one or more UEs; at the same time a BS transmitting DL signals to K SCs using multi-user transmit BF in a frequency channel, a SC simultaneously transmitting DL signals to one or more UEs in its range using the same frequency channel; and, at the same time a BS receiving UL signals from K SCs using multi-user receive BF in a frequency channel, a SC simultaneously receiving UL signals from one or more UEs in its range using the same frequency channel. Furthermore, beamforming using antennas on the SCs is performed to reduce the inter-SC interferences.

17 Claims, 6 Drawing Sheets

MASSIVE MIMO MULTI-USER BEAMFORMING AND SINGLE CHANNEL FULL DUPLEX FOR WIRELESS NETWORKS

This application claims the benefit of U.S. Provisional Application No. 61/905,260, filed on Nov. 17, 2013.

TECHNICAL FIELD

The present application relates to methods for wireless networking to increase throughput over given radio frequency (RF) bandwidth and to apparatus and systems that implement the methods, and more specifically to methods and related apparatus and systems that applies beamforming (BF) in a base station with a large number of RF chains and antennas and uses single channel full duplex radios on an infrastructure node in the next tier, e.g., pico cells.

BACKGROUND

Massive MIMO multi-user Beamforming (MM-MUBF) offers the potential to significantly increase the spectral efficiency and throughput by many folds through spatial multiplexing. However, when the number of RF chains and antennas becomes large (It is understood that an antenna is associated with a RF chain, transmit (Tx) or receive (Rx), thus, hereafter when the number of antennas is used, it should be understood to mean the number of antennas and the associated RF chains), there are significant overhead in channel estimation to obtain Channel State Information (CSI). This problem becomes more challenging if the channel coherence time is short, e.g., in the case of a Base Station (BS) with a large number of antennas communicating with a fast moving User Equipment (UE) because a large number of channels need to be estimated frequently, reducing the time left for actual data communication. This problem is further compounded by the number of fast moving UEs. On the other hand, the industry is moving towards Small Cells (SC) and Heterogeneous Network (HetNet) as a way to meet the fast increasing data traffic. Ideally, the placement of SCs should be determined by the data traffic needs, not constrained by the availability of wired connection to the backhaul network. MM-MUBF is a good match for this need as it can provide high capacity wireless backhaul for many SCs so they can be placed at any place there is a power plug. Since the channels between a BS and SCs are very slow varying, the need for frequent estimation of CSI is alleviated.

However, prior art uses out-band wireless backhaul, meaning that different frequency ranges are used for the backhaul between BS and SC and for the communication with UEs. This requires precious frequency resources, which may not be available especially at low frequencies (a few GHz or lower), and even if they are available, they should be used to increase the data throughput with the UEs. In addition, low frequencies wireless backhaul is desired because it does not require line of sight, and offers better penetration than high millimeter wave frequencies. Thus, in-band wireless backhaul, meaning using the same frequencies for the communication with UEs to provide the wireless backhaul between BS and SCs, is desired. This requires a SC to simultaneously transmit and receive in the same frequency channel, referred to as Single Channel Full Duplex (SCFD).

The terms BS and SC will be used to mean either the radio apparatus for transmitting and receiving signals in a cell or the area covered by such radio apparatus, as evident from the context. The term BS is used to mean a cell coverage area much larger than a SC. In the terminology of 4G LTE, both a BS and a SC in this application can be a "small cell", a SC being a tier below a BS, e.g., a BS below may be a microcell in 4G LTE terminology and SC may be a pico cell in 4G LTE terminology.

This invention presents embodiments that solve the technical challenges discussed above.

DETAILED DESCRIPTION OF THE PRESENT INVENTION

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block may represent a method step or an apparatus element for performing the method step. Depending upon the implementation, the corresponding apparatus element may be configured in hardware, software, firmware or combinations thereof.

Figure 1A:
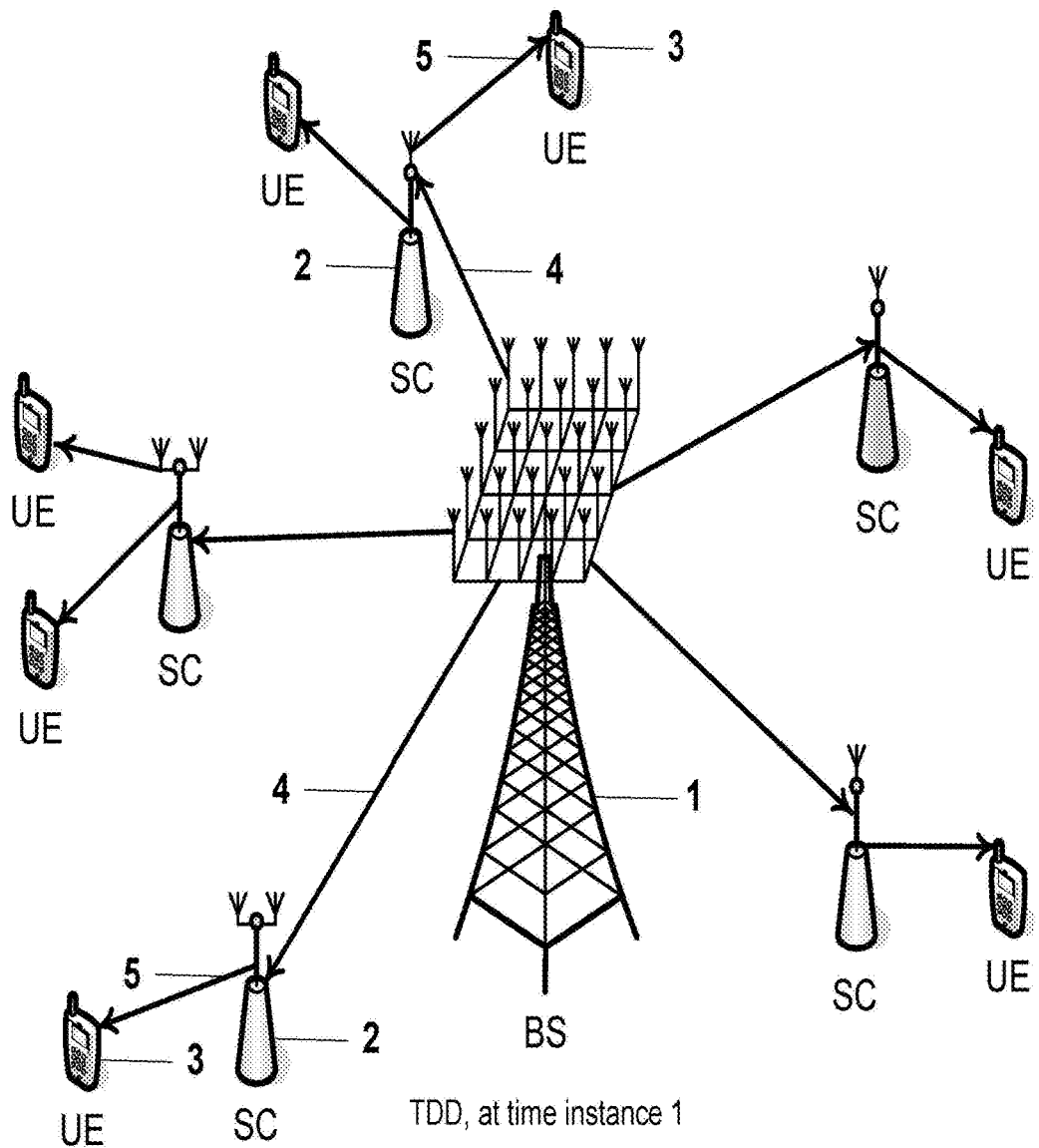
FIGS. 1A and 1B show the network traffic in the downlink and uplink directions respectively for a TDD network.
Figure 1B:
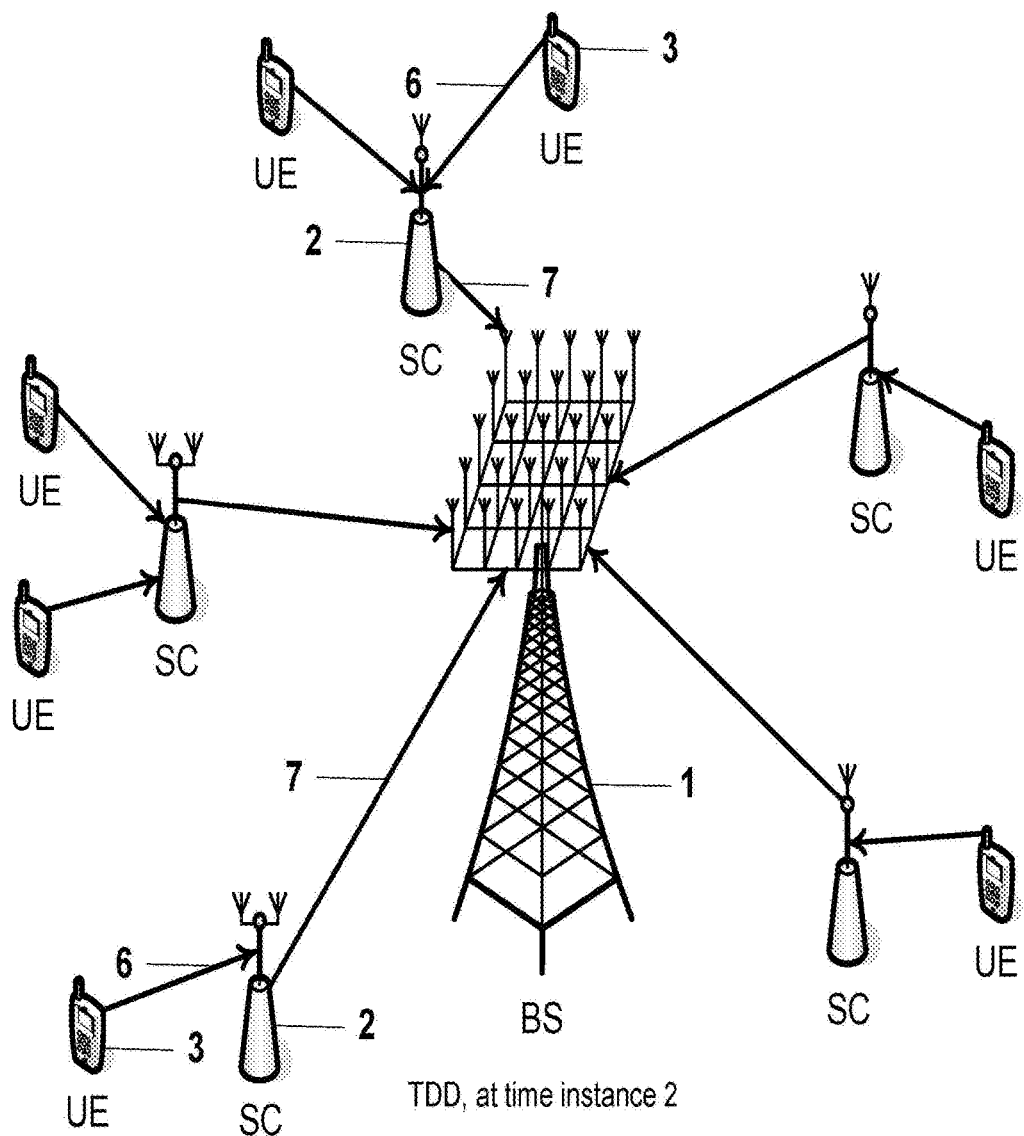

One embodiment of this invention is a method for wireless networking, or the apparatus that implement this method, comprising one or more BS with $N_{bs}$ antennas, two or more SCs in the range of a BS where a SC has $N_{sc}$ antennas and may use $N_{sc1} \leq N_{sc}$ antennas for transmitting or for communication with a BS and $N_{sc2} \leq N_{sc}$ antennas for receiving or for communication with one or more UEs, and one or more UEs in the range of a SC and each UE has up to $N_{ue}$ antennas; at the same time a BS transmits downlink (DL) signals to K SCs using multi-user transmit BF in a frequency channel where K>1 and $N_{bs} > KN_{sc1}$, a SC simultaneously transmits DL signals to one or more UEs in its range using the same frequency channel; and, at the same time a BS receives uplink (UL) signals from K SCs using multi-user receive BF in a frequency channel where K>1 and $N_{bs} > KN_{sc1}$, a SC simultaneously receives UL signals from one or more UEs in its range using the same frequency channel. Note that the same antennas on a SC may be used simultaneously for DL and UL, i.e., there are total $N_{sc} = N_{sc1} = N_{sc2}$ antennas and each is used for both Tx and Rx simultaneously, e.g., through a circulator. FIG. 1 shows an example of a network operated in Time-Division Duplexing (TDD) mode of this embodiment with one BS 1, K=5 SCs 2 and one or more UEs 3 in each SC. FIG. 1A shows the network traffic in the downlink direction which includes the BS-SC links 4 and the SC-UE links 5, and FIG. 1B shows the network traffic in the uplink direction which includes the UE-SC links 6 and SC-BS links 7. As can be seen form FIG. 1, in either direction, the SC is required to simultaneously transmit and receive in the same frequency channel. Such a SC is referred to as working in Single Channel Full Duplex (SCFD) mode. This embodiment is referred to as MFD-SC (MUBF single channel Full Duplex Small Cell). Full Duplex Small Cell requires self-interference cancellation, that is, canceling the interference to the SC's receiver caused by the Tx signals from its transmitter. This self-interference cancellation can be performed using a RF filter that generates a RF cancellation signal to subtract the self-interference from the received RF signal prior to the Low Noise Amplifier (LNA) of the receiver to avoid saturating the LNA. It may further be canceled by generating an analog cancellation signal in analog baseband or IF (intermediate frequency) to avoid saturating the ADC. What is remaining of this interference may further be canceled in digital baseband signal processing techniques. A combination of these cancellation techniques can avoid saturating the LNA and the ADC, and improve the SINR sufficiently to achieve the desired data rate.

In the descriptions below, without loss of generality, we assume each BS, SC and UE in the network has the same number of antennas and $N_{sc}=N_{sc1}=N_{sc2}$ for simple presentation. The description can be easily modified to different numbers of antennas for the BSs, SCs and UEs and $N_{sc1}<N_{sc}$ or $N_{sc2}<N_{sc}$ without changing the nature of the description.

Let the channel from a BS to the K SCs be denoted by a $KN_{sc} \times N_{bs}$ matrix $H_{b-s}$, the channel from a SC to its UEs be denoted by a $MN_{ue} \times N_{sc}$ matrix $H_{s-u}$, and the channel from a BS to the UEs be denoted by a $KM\ N_{ue} \times N_{bs}$ matrix $H_{b-u}$, where M is the number of UEs served simultaneously by a SC in the same resource block. Without loss of generality, we assume M=1 in the description below.

In the downlink direction, multi-user transmit BF can provide power gain over the entire available bandwidth for each SC while eliminating or significantly reducing the interference from the multiple streams. It can be achieved using either the Zero Forcing (ZF) method, the Conjugate Beamforming (CB) method or other methods for beamforming. ZF is used below for the description of the embodiments. With ZF BF, the BF matrix $B_d = [H_{b-s}^H (H_{b-s} H_{b-s}^H)^{-1}]$ is the pseudo-inverse and the received signal $y_{sc}$ by the SCs is given by $$y_{sc}=H_{b-s}[H_{b-s}^H(H_{b-s}H_{b-s}^H)^{-1}]S_d x_{bs}+n_{sc}=S_d x_{bs}+n_{sc} \quad (1)$$

where $x_{bs}$ is the signal transmitted by the BS to the K SCs, $n_{sc}$ is the noise vector at the SC, and $S_d$ is a power scaling matrix which is typically diagonal.

In the uplink directions, multi-user receive BF can be achieved using ZF with BF matrix $B_u=[(H_{b-s}^* H_{b-s}^T)^{-1} H_{b-s}^*]$ and the received signal $y_{bs}$ by the BS is given by $$y_{bs}=[(H_{b-s}^*H_{b-s}^T)^{-1}H_{b-s}^*]H_{b-s}^T S_u x_{sc}+[(H_{b-s}^* H_{b-s}^T)^{-1}H_{b-s}^*]n_{bs}=S_u x_{sc}+B_u n_{bs} \quad (2)$$

where $x_{sc}$ is the signal transmitted by the K SCs to the BS, $n_{bs}$ is the noise vector at the BS, and $S_u$ is a power scaling matrix which is typically diagonal.

In SCFD, the same frequency band is used for both UL and DL. Therefore, the DL and UL channels can be considered reciprocal after calibration of transfer functions of the Tx and Rx chains. This channel reciprocity can be used to reduce the overhead in channel estimation needed for BF. A BS can estimate $H_{b-s}$ by having SCs transmits pilot signals.

In the downlink direction, when the BS is transmitting to SC(s) while a SC is transmitting to a UE, the BS→SC transmission causes interference to the UE. One embodiment adds interference suppression to MFD-SC, referred to as MFD-SC-IS (MFD-SC with Interference Suppression) by adding a null space pro-coding matrix to suppress this interference. This is doable when $N_{bs}$ is much larger than the number of total antennas on all the UEs in the range of the BS. Assuming the total number of antennas on all the UEs is $K\ N_{ue}$ and $N_{bs} \gg K\ N_{ue}$, find a $N_{bs} \times (N_{bs}-K\ N_{ue})$ matrix G that satisfies $H_{b-u}G=0$ where 0 is a $K\ N_{ue} \times (N_{bs}-K\ N_{ue})$ all-zero matrix. Then, in the downlink direction, using the BF matrix $$B_{di}=G(H_{b-s}G)^+, \quad (3)$$

where $(H_{b-s}G)^+$ is the pseudo-inverse of $(H_{b-s}G)$ and at least $N_{bs} \gg K\ (N_{sc}+N_{ue})$, the received signal $y_{sc}$ by the SCs is given by $$y_{sc}=H_{b-s}B_{di}S_d x_{bs}+n_{sc}=S_d x_{bs}+n_{sc}. \quad (4)$$

But the interference $y_{uei}$ received by the UEs due to BS→SC transmission is given by $$y_{uei}=H_{b-u}B_{di}S_d x_{bs}=0 \quad (5)$$

because $H_{b-u}G=0$.

Figure 2:
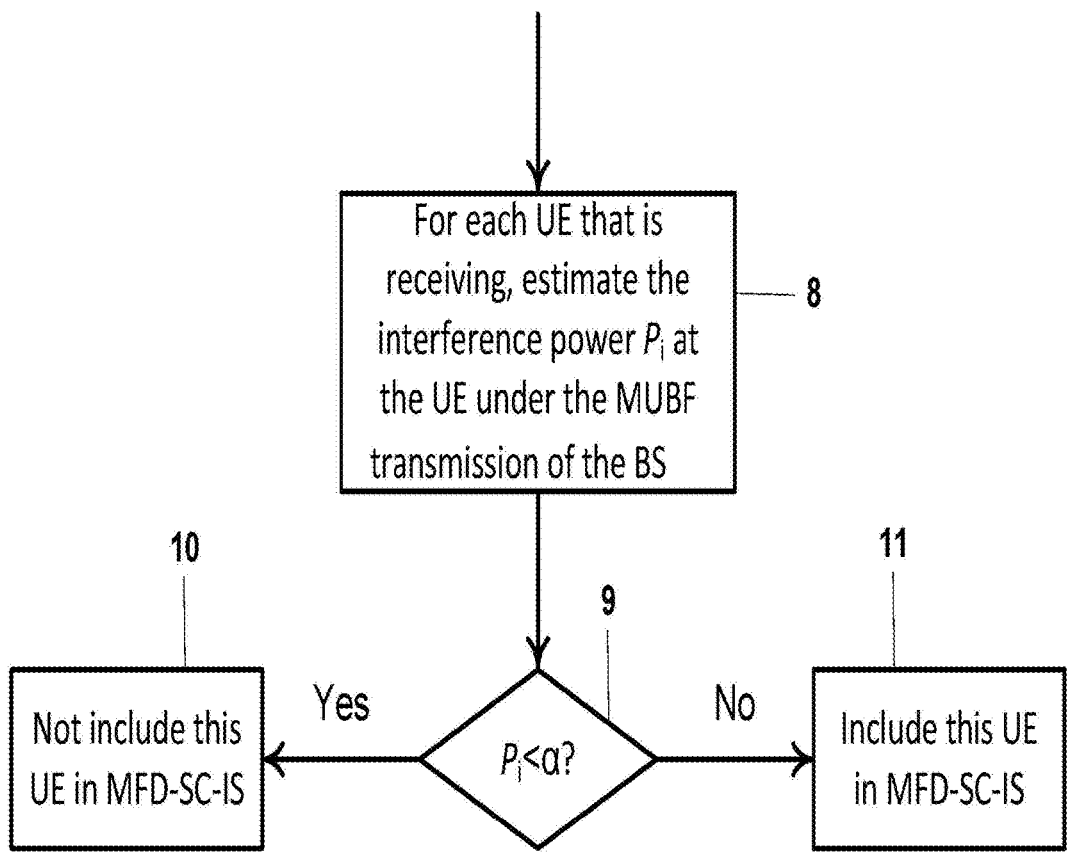
FIG. 2 shows the flowchart for a BS to decide whether a UE should be included in MFD-SC-IS.

MFD-SC-IS achieves higher overall throughput than MFD-SC because the Signal to Interference and Noise Ratio (SINR) is higher for the UEs. However, this throughput gain comes with a cost: the interference suppression pre-coding matrix may affect the transmission power, and there is additional overhead for estimating the CSI of the BS-UE channels, i.e., the BS needs to estimate $H_{b-u}$. When both BS and UEs can transmit and receives using the same frequency channel, the channel reciprocity can be used to reduce the overhead. Namely, a BS can estimate $H_{b-u}$ by having a UE transmits pilot signals. Unlike the SCs which are typically static, the UEs can be fast moving, thus, the channel estimation may need to be repeated often due to the short BS-UE channel coherence time. Thus, in one embodiment as shown in FIG. 2, the interference from the MUBF transmission of a BS to a UE is estimated, i.e., the interference power $P_i$ at the UE under the MUBF transmission of the BS is estimated 8. Then the estimated $P_i$ is compared with a threshold α 9. If the interference is smaller than the required value α, the BS uses MFD-SC with regards to this UE, i.e., the BS does not include this UE in the MFD-SC-IS pre-coding matrix 10; on the other hand, if the interference is larger than a required value α, the BS uses MFD-SC-IS with regards to this UE, i.e., the BS includes this UE in the MFD-SC-IS pre-coding matrix 11.

The MFD-SC and MFD-SC-IS embodiments enable a new cellular architecture with wireless backhaul SCs. Because the BSs use massive MIMO MUBF, each BS can provide full bandwidth wireless link with many SCs simultaneously by spatial multiplexing and have BS-SC links with higher SINR than the BS-UE links. At the same time, each radio on the BS can be low power because of massive MIMO power gain. MUBF reduces the interferences to other nodes. Since a SC is close to UEs in its range, the SINR of the SC-UE improves. As a result, analysis and data show that the MFD-SC and MFD-SC-IS embodiments offer significant throughput gain in both DL and UL directions over simple TDD based wireless backhaul where the BS-SC and SC-UE communications are separated in time, namely, when a BS sends DL data to SCs, the SCs are not transmitting, and when SCs send data to UEs, the BS is not transmitting, vice versa, when a SCs send UL data to the BS, the UEs are not transmitting, and when UEs send data to SCs, the SCs are not transmitting.

Analysis and data also show that when $N_{bs}$ is sufficiently larger than $KN_{sc}$, the backhaul throughput with a SC in MFD-SC-IS or MFD-SC can match the throughput of the SCs, thus achieving the same effect of a wired backhaul without requiring wired backhaul connections at the SCs.

In MFD-SC and MFD-SC-IS, there is also additional interferences in the network that are not present in an prior art TDD wireless backhaul SC network, namely, the interference on a SC's receiving of signal from a UE caused by another SC's transmission to a BS, the interference on a SC's receiving of signal from a BS caused by another SC's transmission to a UE, and the interference on a BS's receiving of signal from SCs cause by transmission of UEs to SCs. The last of the three can be dealt with by the massive MIMO receive BF at the BS. In some cases, this UE to BS interference may be neglected when UE's signal is much weaker at BS than the SC's signal at the BS, which is typically the reason for using the SC to serve the UE. The first two interferences, referred to as SC-SC interferences, may be reduced by having (a) the SCs sufficiently far apart or selecting sufficiently far apart SCs in a time slot to participate in MFD-SC, (b) using different frequencies segments or subcarriers for the interfering BS-SC-UE links, or (c) using MIMO BF by the SCs. The second case (b) is an embodiment further comprising allocating a different frequency segment or set of subcarriers to each BS-SC-UE(s) path that is causing significant SC-SC interference to each other. The BS still communicate with a SC using the same frequencies as the SC uses to communicate with its UEs, so each path is still the same MFD-SC embodiment described above but neighboring BS-SC-UE(s) paths no longer causes SC-SC interference because they use different frequencies. The latter case (c) is an embodiment further comprising one or more SCs that use multiple antennas in its transmission to BF to the receiving nodes, either the BS or UE, which increase the SINR at the intended receiver and reduces the SC-SC interference.

For SCFD to function, the self-interference at a SCFD-SC must be canceled well, i.e., the interference caused by a SCFD-SC's Tx signal on its receiver must be canceled, ideally completely. But in practice, the self-interference is not completely canceled. The effect of incomplete cancellation of self-interference on the MFD-SC and MFD-SC-IS embodiments were analyzed and the results show that even with incomplete cancellation of self-interference, the MFD-SC and MFD-SC-IS embodiments still offer significant throughput gain in both DL and UL directions over simple TDD, albeit less than with complete self-interference cancellation.

The MFD-SC and MFD-SC-IS embodiments may further comprises having the choice to use both wired backhaul SCs and wireless backhaul SCs in a wireless network, and in areas where the BS-UE link is too weak to support high data rate, evaluating the BS-UE and BS-SC wireless link and deciding whether to use the a wired backhaul SC or a wireless backhaul small cell. Furthermore, in an area a wireless backhaul SC can be used, the BS-UE interferences and SC-SC interferences is evaluated based on analysis of the deployment and path loss assessment to decide whether to use a SCFD-SC or use different frequency resource blocks (FRBs) or Almost Blank Subframes (ABSs) in different FRBs for BS-SC and SC-UE communications.

In prior art eICIC inter-cell interference control technology, when a SC is communicating with UE(s) in its range using a FRB, e.g., set of subcarriers, the BS uses ABS to communicate with other UEs to avoid interfering with the SC-UE communication in the same FRB at the same time. One embodiment of this invention modifies the above MFD-SC embodiment, instead of a SC simultaneously transmits and receives using exactly the same frequencies, by allocating different FRBs or subcarriers for the BS-SC communication and the SC-UE communication. The overall throughput will decrease compared with MFD-SC but it eliminates the need of suppression of BS to UE interference and SC-SC interferences. This may still be considered in-band wireless backhaul because the FRBs allocated for BS-SC and SC-SC communications can all be in the same frequency band for a prior art TDD network. An SC in such an embodiment still needs to perform self-interference cancellation as the SC can transmit using a first set of FRB(s) that is right next to a second set of FRB(s) over which the SC is receiving, without a frequency gap or with a very small frequency gap between the two sets to avoid wasting frequency resources. As a result, the SC's receiver must cancel the strong interference from the SC's transmitting signal in the first set of FRBs in order to receive the weaker signal from the BS or UE in the second set of FRBs. This interference cancellation can be performed using a RF filter to generate a RF cancellation signal that subtracts the interfering signal in the first set of FRB(s). It may further be canceled by generating an analog cancellation signal in analog baseband or IF (intermediate frequency) to avoid saturating the ADC. In digital baseband, the subcarriers in the first set of FRB(s) can be simply ignored as the received signals are in the non-overlapping second set of FRB(s).

In another embodiment, a BS with a large number of antennas, e.g., $N_{bs}=128$, uses massive MIMO MUBF with a first ABS to transmitting to SCs to remove interference to UEs in SCs, and BS receives from SCs using massive MIMO MUBF while the neighboring SCs use a second ABS to avoid SC to SC interference on one SC's receiving of a signal from its UE due to transmission from a neighboring SC. The first ABS is over the FRB(s) used by the SCs to transmitting to their UEs. The second ABS is over the FRB(s) used by the UEs in neighboring SCs to transmit to their SCs.

The embodiments for mitigating the SC-SC interferences may further include scheduling and coordination among SCs in each other's interference range using either frequency or time resource blocks depending on the properties of the BS, SCs and UEs, the conditions of the channels, the data traffic requirements such as delay and jitter, and/or the availability of the frequency resources. When small delay or small jitter is required, maintaining continuous data transmission between BS-SC using one FRB and continuous data transmission between SC-UE using another FRB is more advantageous.

Figure 3:
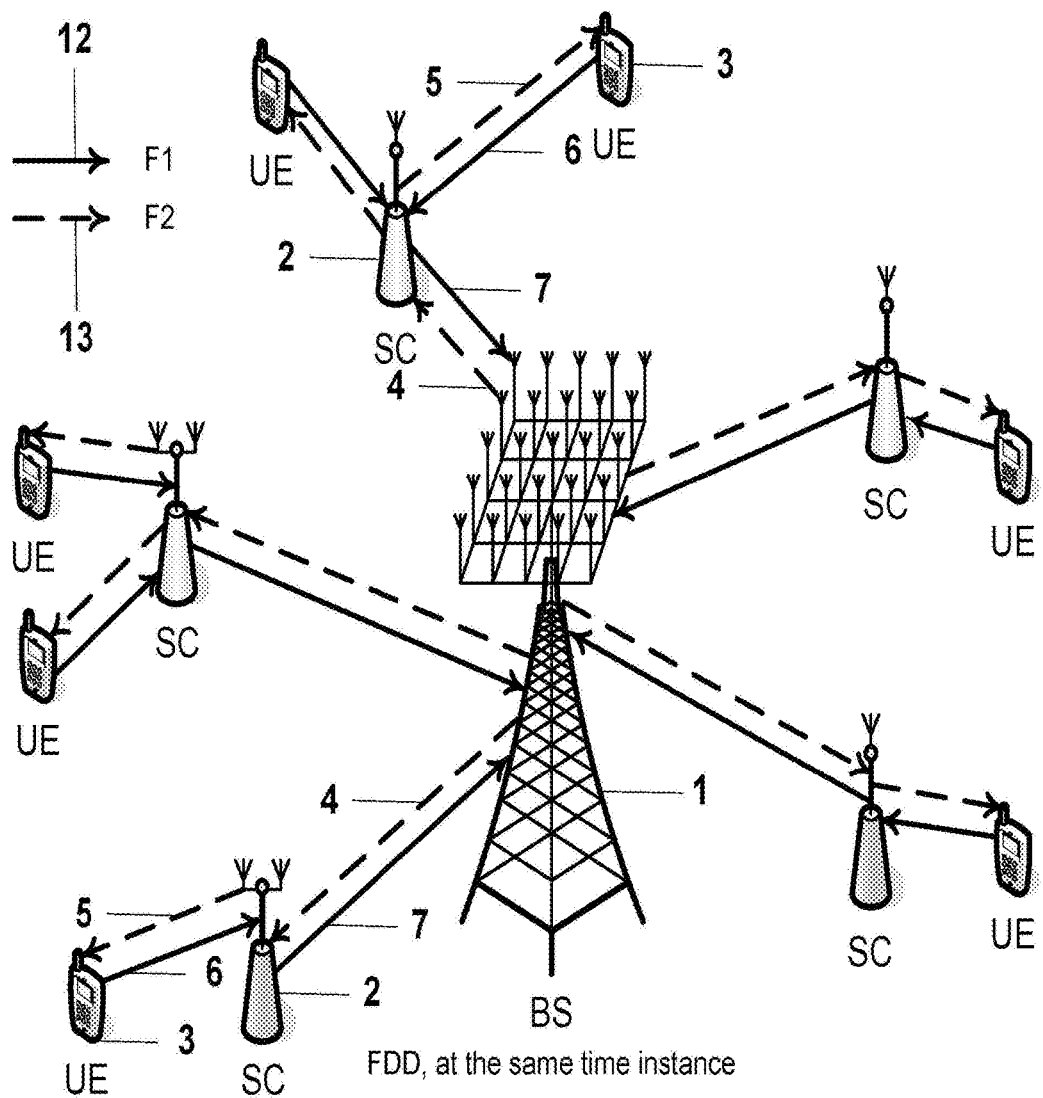
FIG. 3 shows the network traffic in the downlink and uplink directions for a FDD network.

When Frequency Division Duplex (FDD) is used for the BS, SC and UE, the MFD-SC embodiment can be modified so that when a BS receives UL with MUBF from SCs using a first frequency band F1 12, the SCs are receiving UL from their UEs using the same frequency band F1, and reversely, at the same time, BS transmits DL with MUBF to SCs using a second frequency band F2 13 while SCs are transmitting DL to their UEs using the same frequency band F2, as shown in FIG. 3. A SC in this embodiment has two or two sets of SCFD radios, one performing self-interference cancelation at F1 and the other performing self-interference cancelation at F2. BSs, SCs and UEs in such an embodiment are all FDD apparatus and the effect is superimposing the two time instances in FIGS. 1A and 1B together in the same time instance.

Figure 4A:
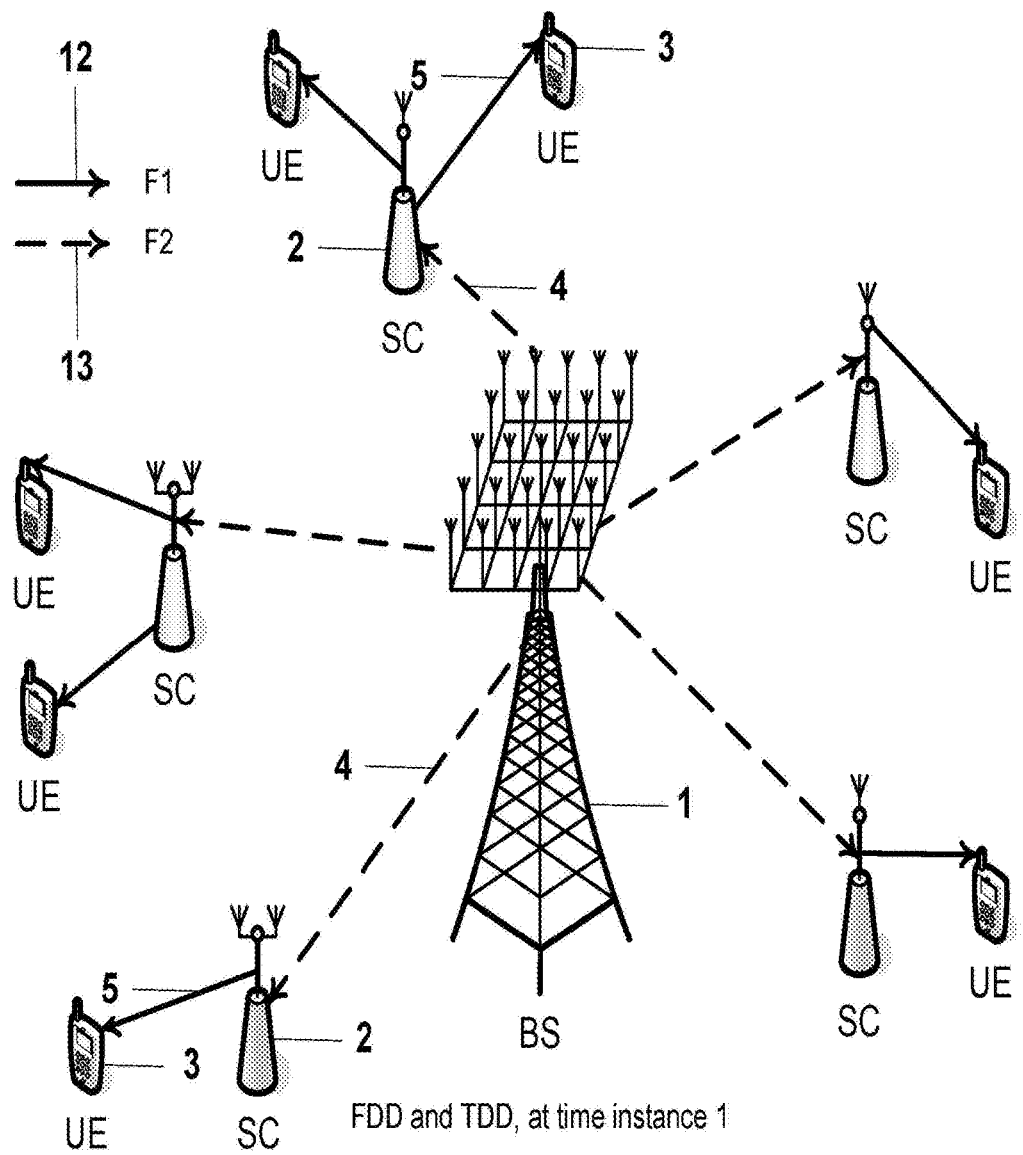
FIGS. 4A and 4B show the network traffic in the downlink and uplink directions respectively for a FDD-TDD network.
Figure 4B:
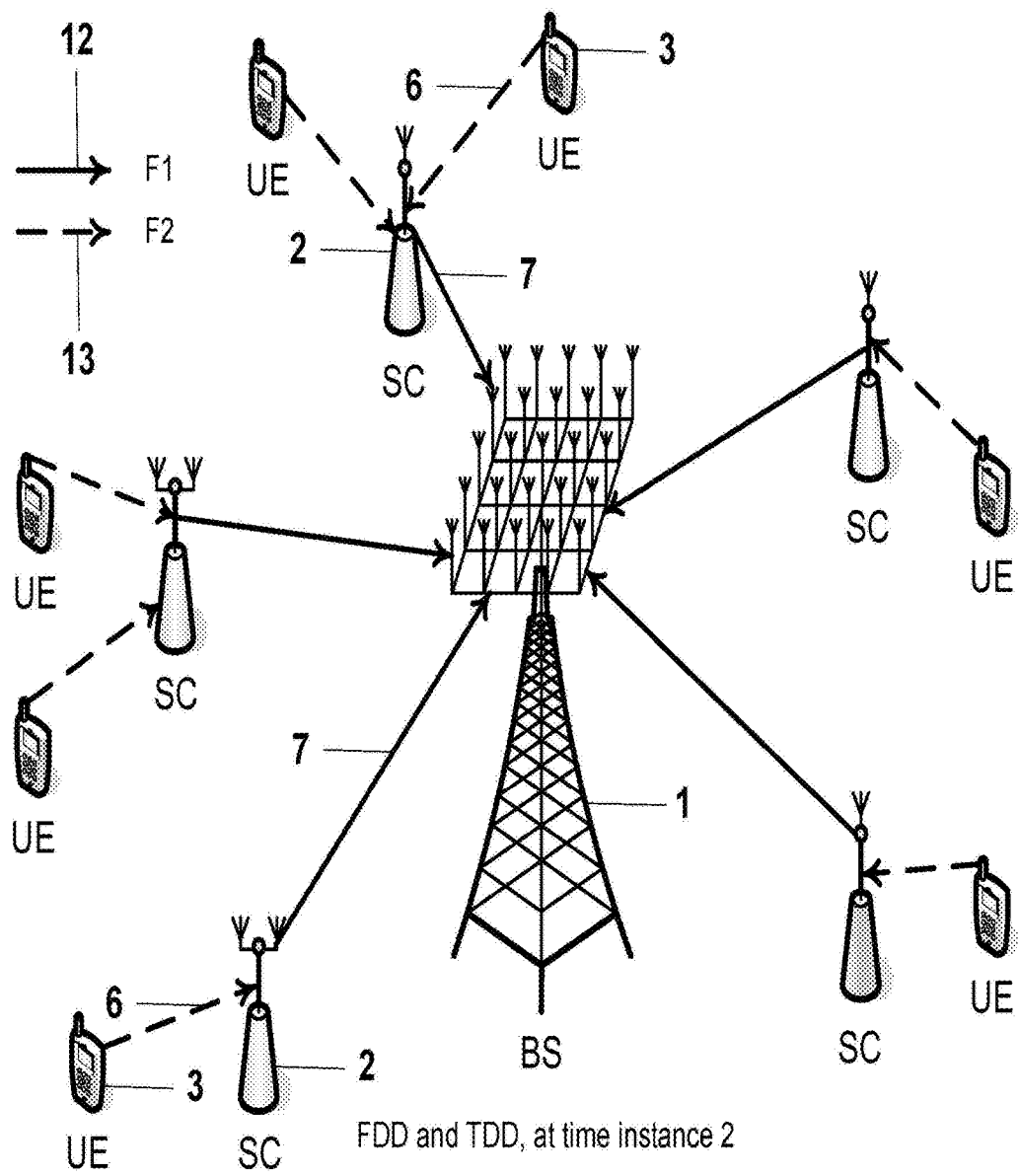

In another FDD embodiment, the direction of F1 and F2 are reversed in the SC-UE link and the network traffic is separated using time division, as shown in FIGS. 4A and 4B. BSs, SCs and UEs in such an embodiment are all FDD apparatus with the BS and UE using F1 to receive and F2 to transmit but the SC using F1 to transmit and F2 to receive.

This embodiment has the advantage that it eliminates the BS-UE and SC-SC interferences and it does not require SCFD. The throughput is reduced but the complexity is also lowered. People skilled in the art can see that other combinations of the FDD and TDD can be obtained with different tradeoff on throughput and complexity. Note that when a SC is transmitting to or receiving from multiple UEs, different frequencies or subcarriers in the band can be used for each UE.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

What is claimed is:

1. A method for wireless networking comprising one or more base stations (BSs) with $N_{bs}$ antennas; two or more small cells (SCs) in the range of each of said one or more base stations, wherein each of said two or more small cells has $N_{sc}$ antennas, and uses $N_{sc1} \leq N_{sc}$ antennas for communication with said BS in the range and uses $N_{sc2} \leq N_{sc}$ antennas for communication with one or more user equipment (UEs); which comprises:

at the same time a BS selected from said one or more BSs is transmitting downlink (DL) signals to K SCs selected from said two or more SCs in the range thereof using multi-user transmit beamforming (BF) in a DL frequency channel where K>1 and $N_{bs} \geq KN_{sc1}$, a SC selected from said K SCs receiving the DL signals from said BS and simultaneously transmitting DL signals to one or more UEs in its range using the same DL frequency channel in a single-channel full duplex mode and performing cancelation of an interference from the transmission of the DL signals to the one or more UEs on the receiving of the DL signals from the BS, and canceling the remaining interference after an Analog to Digital Converter in digital baseband using digital signal processing; and at the same time said BS selected from said one or more BSs is receiving uplink (UL) signals from said K SCs using multi-user receive BF in a UL frequency channel where K>1 and $N_{bs} \geq KN_{sc1}$, said SC selected from said K SCs transmitting the UL signals to said BS simultaneously receiving UL signals from said one or more UEs in its range using the same UL frequency channel in a single-channel full duplex mode and performing cancelation of an interference from the transmission of the UL signals to the BS on the receiving of the UL signals from the one or more UEs, and canceling the remaining interference after an Analog to Digital Converter in digital baseband using digital signal processing.

2. The method in claim 1, wherein said BS selected from said one or more BSs selects the number of BS antennas to use such that said number is sufficiently larger than the total number of antennas on said K SCs communicating with said BS using the same frequency resource to match the throughput of the link between said BS and said K SCs with the sum throughput of said K SCs.

3. The method in claim 1 further comprising canceling self-interference using a RF filter that generates a RF cancelation signal to subtract the self-interference from the received RF signal prior to the Low Noise Amplifier of the receiver.

4. The method of claim 1 further comprising canceling self-interference that exists after the Low Noise Amplifier by generating an analog cancelation signal in analog baseband or IF (intermediate frequency) prior to Analog to Digital Converter.

5. The method in claim 1, further comprising using the same antennas on at least one of said K SCs simultaneously for DL and UL with $N_{sc}=N_{sc1}=N_{sc2}$ for said at least one of said K SCs.

6. The method in claim 1 further comprising transmitting DL signals from said SC selected from said K SCs to at least one of said one or more UEs in its range using a first frequency channel at one time slot and receiving UL signals from said at least one UE(s) using the same first frequency channel at another time slot in a Time-Division Duplexing network.

7. The method in claim 6 further comprising the BS selected from said one or more BSs estimating the channel matrix of the channels between the BS and the two or more SCs $H_{b\text{-}s}$ by having the SCs transmits UL pilot signals, and using channel reciprocity to estimate the downlink channel from the BS to the SCs.

8. The method in claim 1 further comprising simultaneously, via SCs, transmitting DL signals to one or more UEs in its range using a first frequency channel and receiving UL signals from said one or more UEs using a second frequency channel in a Frequency-Division Duplexing network.

9. The method in claim 1 further comprising suppressing the interference of the BS to SC transmission to the SC to UE transmission by adding a null space pro-coding matrix to the BS to SC transmission.

10. The method in claim 9 further comprising
estimating the interference power $P_i$ at a UE under the multi-user beamforming (MUBF) transmission of the BS,
comparing the estimated $P_i$ with a threshold $\alpha$, and
if the interference is larger than a required value $\alpha$, the BS including this UE in the interference suppression pre-coding matrix.

11. The method in claim 1 further comprising allocating a different frequency segment or set of subcarriers to each BS-SC-UE(s) path that is causing significant inter-SC interference.

12. The method of claim 1 further comprising beamforming in DL from BS to UEs or UL from UEs to BS using the antennas of one or more SCs to reduce the inter-SC interference.

13. The method of claim 12 wherein the beamforming pre-coding computation is performed at one or more of the SCs.

14. The method of claim 12 wherein the beamforming pre-coding computation is performed at the BS.

15. The method in claim 1 further comprising using both wired backhaul to some SCs and wireless backhaul to other SCs in a wireless network.

16. The method in claim 1 further comprising using one frequency channel for wireless link between a BS and a SC and a different frequency channel for wireless link between a SC and a UE.

17. An apparatus for wireless networking comprising a baseband and radio frequency components supporting $N_{sc}$ antennas, wherein the apparatus uses $N_{sc1} \leq N_{sc}$ antennas for communication with a BS with $N_{bs}$ antennas and uses $N_{sc2} \leq N_{sc}$ antennas for communication with one or more UEs in its range;

wherein the apparatus communicates wirelessly with a BS;

wherein, at the same time a BS is transmitting DL signals to the apparatus using multi-user transmit BF in a DL frequency channel where $N_{bs} \geq KN_{sc1}$, the apparatus operates in single-channel full duplex mode by simultaneously transmitting DL signals to said one or more UEs in its range using the same DL frequency channel and receiving the DL signals from the said BS and performing cancelation of the interference from the transmission of the DL signals to the one or more UEs on the receiving of the DL signals from the said BS, and canceling the remaining interference after an Analog to Digital Converter in digital baseband using digital signal processing; and at the same time the BS is receiving UL signals from the apparatus using multi-user receive BF in a UL frequency channel where $N_{bs} \geq KN_{sc1}$, the apparatus operates in single-channel full duplex mode by simultaneously receiving UL signals from the one or more UEs in its range using the same UL frequency channel and transmitting the UL signals to said BS, and performing cancelation of the interference from the transmission of the UL signals to said BS on the receiving of the UL signals from the one or more UEs, and canceling the remaining interference after an Analog to Digital Converter in digital baseband using digital signal processing.

* * * * *